No. 628,168. Patented July 4, 1899.
G. F. SIEVERN.
WELDING MECHANISM.
(Application filed Feb. 6, 1899.)
(No Model.) 2 Sheets—Sheet 1.

WITNESSES:
Chas. F. Miller
F. E. Gaither

INVENTOR,
Gustav F. Sievern
by Darwin S. Wolcott
Att'y.

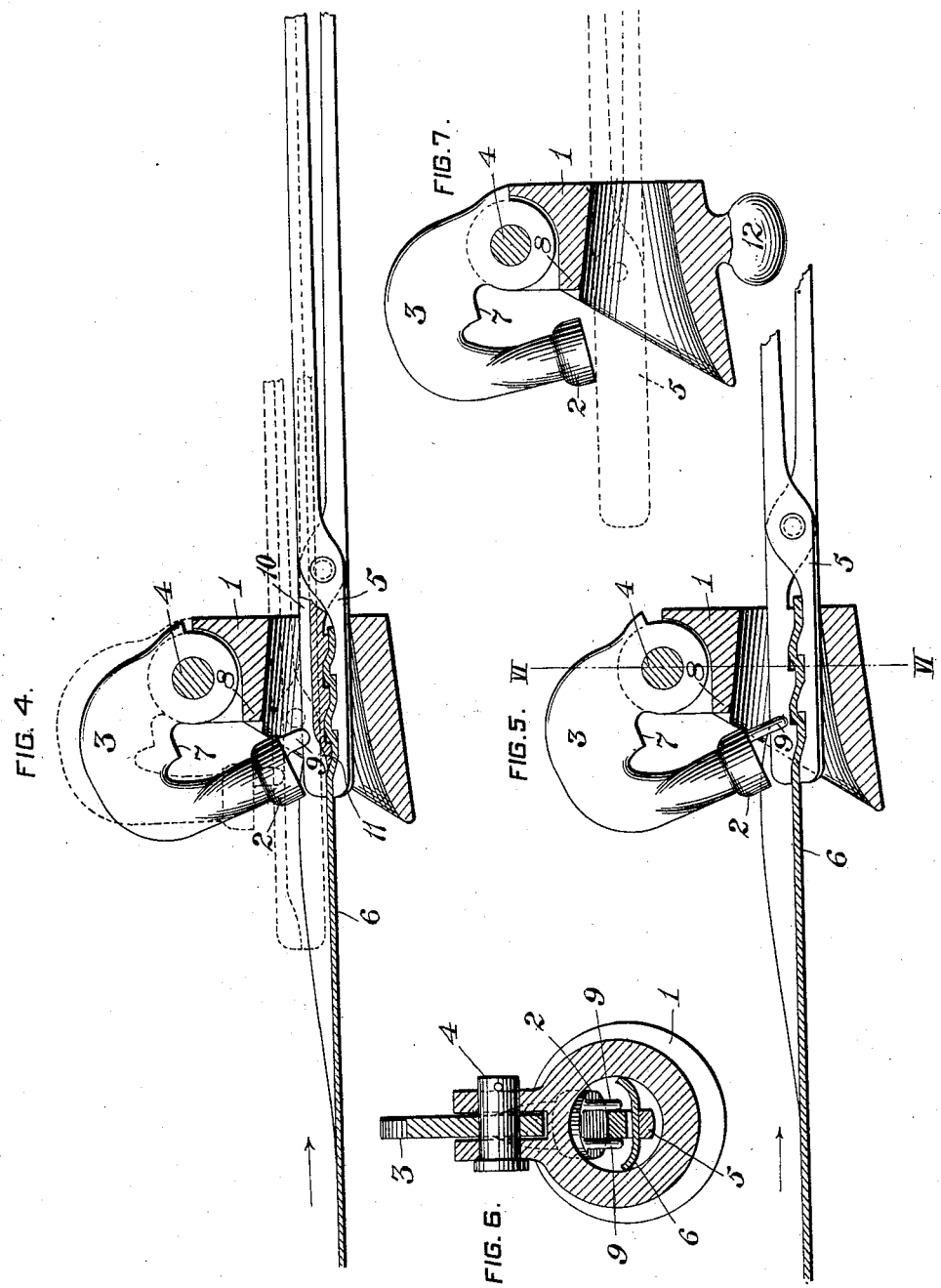

UNITED STATES PATENT OFFICE.

GUSTAV F. SIEVERN, OF REYNOLDTON, PENNSYLVANIA.

WELDING MECHANISM.

SPECIFICATION forming part of Letters Patent No. 628,168, dated July 4, 1899.

Application filed February 6, 1899. Serial No. 704,681. (No model.)

*To all whom it may concern:*

Be it known that I, GUSTAV F. SIEVERN, a citizen of the United States, residing at Reynoldton, in the county of Allegheny and State of Pennsylvania, have invented or discovered certain new and useful Improvements in Welding Mechanism, of which improvements the following is a specification.

The invention herein described relates to improvements in mechanism for welding pipe in welding bells, and has for its object the production of pipe welded in bells which is firmly welded within and without and is smoothly finished on its inner surface as well as on its outer surface.

Figure 1:
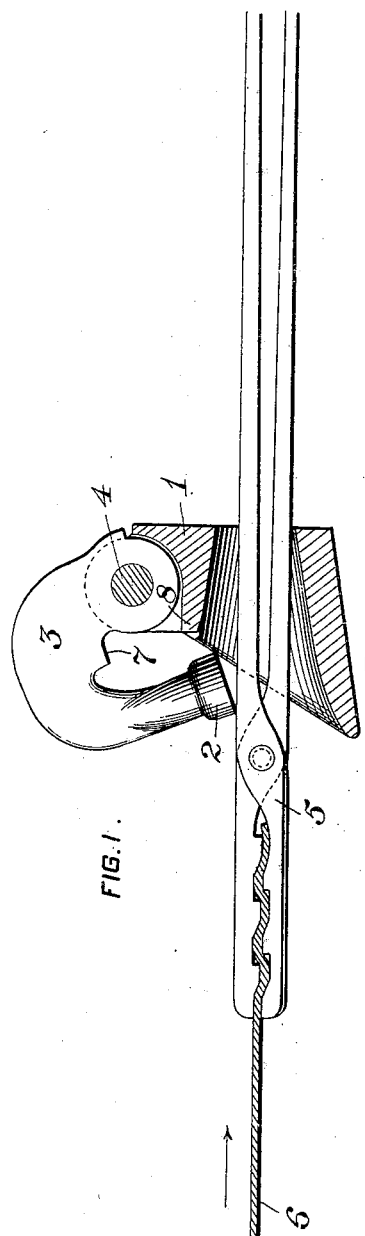
Figure 2:
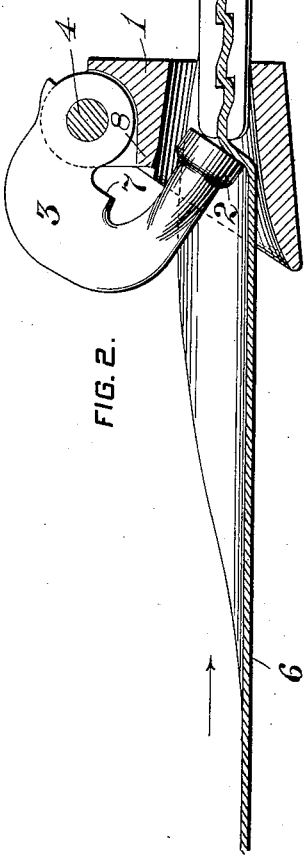
Figure 3:
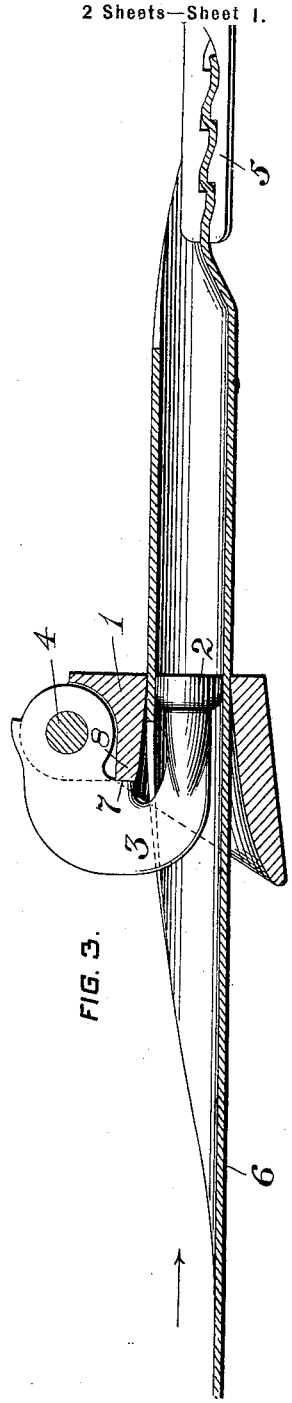

In the accompanying drawings, forming a part of this specification, Figures 1, 2, and 3 are side views of my improved mechanism, showing a piece of skelp passing through the bell drawn by a pair of pipe-tongs and the mandrel or ball in successive operative positions. The bell and the skelp are shown in section in these figures. Figs. 4 and 5 are similar views of my improved mechanism with guides attached to the mandrel. Fig. 6 is a sectional view of Fig. 5, the line of section being indicated at VI VI in Fig. 5. Fig. 7 is a side view, partly in section, of my improved mechanism, showing another means of guiding the mechanism into position, as will be hereinafter described.

Reference being had to the accompanying drawings, 1 represents a pipe-welding bell of familiar form of construction.

2 represents a mandrel or ball.

5 represents a pair of pipe-tongs.

6 represents a piece of skelp which is being formed and welded into pipe, as is most clearly shown in Fig. 3.

The mandrel or ball 2 is circular in cross-section and in size is approximately equal to the caliber of the pipe to be welded. This mandrel or ball 2 is carried upon a curved arm 3, which arm is pivotally mounted upon the bell, as is shown at 4, in such manner that the mandrel or ball may swing into operative position in the throat of the bell or be withdrawn therefrom. The arm 3, which carries the mandrel or ball 2, is preferably provided with a shoulder 7, which when the mandrel is brought into operative position bears upon the edge of the bell at 8, and thus firmly holds the mandrel or ball in operative position while the skelp is being drawn and welded into pipe. Alternative means of providing a secure resisting-stop for the mandrel or ball will readily occur to one skilled in the art.

The operation of welding pipe with my improved mechanism is conducted in the following manner: The bell being secured in operative position opposite to the discharge-mouth of the furnace in which the skelp is heated for welding and the tongs or other tool by which pipe may be drawn projecting through the bell and affixed to a piece of skelp in the furnace and the ball being then withdrawn from the bell, its edge resting upon the upper edge of the drawing-tool, as shown in Fig. 1, the drawing-tool is retracted through the bell, drawing after it the skelp from the furnace and through the bell. As the tongs, or other drawing-tool, are retracted through the bell the ball is resting upon their upper surface by gravity. The thickness of the tool and the pivotal angle of the ball-arm are such that as the tool is retracted through the bell the ball slips along the upper surface of the tool. When, however, the end of the tool passes from beneath the ball, the latter falls or rotates on its pivotal arm by reason of gravity and rests upon the skelp. Then as the skelp advances into the bell the ball is carried by frictional contact with the skelp into operative position. Fig. 2 shows the ball advancing into operative position while in contact with the skelp, and Fig. 3 shows the ball in operative position in the bell and the skelp passing around it and being formed and welded into pipe. When the ball is thus brought into place, the continued retraction of the drawing-tool feeds the skelp into the bell, the edges of the skelp passing on either side of the arm 3 being brought together in the throat of the bell and welded.

It will be understood that as the interior of the bell and the exterior of the ball correspond approximately in size to the desired outer and inner dimensions of the pipe the ball will be held central in the bell without strain, and it will also be understood that as the annular opening for the passage of the skelp is the shape and size of a cross-section of pipe the pressure produced by the drawing of the skelp will firmly weld the pipe and at the same time will produce a smooth surface on the inside as well as on the outside of the pipe.

The construction and operation of my improved mechanism being such as I have described above, I shall now describe certain auxiliary means whereby the operation of drawing pipe with my improved mechanism may be carried on with expedition.

The operation of welding pipe with a bell is customarily carried on in this manner: When the skelp in the heating-furnace is ready for welding, the tongs or tag or other drawing-tool being attached to the end of the skelp, a bell is thrust over the end of the tool and allowed to slip down the tool toward the mouth of the furnace. By manipulating the drawing-tool the operator then slips the bell into a clamp, or, in mill parlance, a "stop," where it is securely held while the skelp is being drawn through it. The bell which is customarily used has no auxiliary mechanism attached to it. It is symmetrical throughout, and therefore there is no occasion for controlling its tendency to revolve around the drawing-tool as it slips down the tool and into position in the clamp or stop; but when my improved mechanism, which I have already described, is affixed to the bell it will be readily understood that the bell must be seated in the clamp or stop with the pivotal joint uppermost and the arm which carries the mandrel or ball in an approximately vertical plane. This is necessary in order that the ball shall swing freely on its arm and that the skelp shall be brought up around the arm equally on either side. To this end I have devised several means whereby the bell may be readily brought into proper operative position in the clamp. I have shown in my drawings three different means of accomplishing this end.

The device illustrated in Fig. 4 consists in a tongue 9, projecting from the face of the ball 2, and a groove 10, formed in the upper edge of the tongs 5. The tongue and groove are so formed that the former projects into the latter, and by this means the bell is maintained in an upright position as it slips down the drawing-tool and is inserted in the clamp. It will be observed in this connection that the groove must be of sufficient depth near the extremity of the tool to allow the tongue to swing clear of the bottom of the groove as the ball is carried into operative position. Accordingly the groove may be made with maximum desired depth throughout, or it may be cut entirely through the portion of the reins and jaws which are uppermost, or the groove may be made shallower throughout the greater part of its length and its depth increased throughout that portion of it where greater depth is necessary. This increased depth is shown at 11 in Fig. 4. The relative positions of the bell, the tongs, and the ball (shown by dotted lines in Fig. 4) are such as they assume while the bell is slipping down the tongs and into position in the clamp. The full lines show the relative positions of the parts when the bell is seated in the clamp and the drawing of the pipe is beginning.

The device illustrated in Figs. 5 and 6 is another means of accomplishing the same end. It consists in the formation of two tongues 9 9, projecting from the face of the ball 2. These tongues are so arranged that they straddle the tongs 5, and the bell is thus properly guided down the tongs and brought into the clamp in upright position.

A third means of maintaining the bell in upright position is shown in Fig. 7. It consists in a weight 12, attached to the lower part of the bell and serves by the gravity of the weight to keep the bell in upright position while supported on the drawing-tool. The tongs 5 are here shown in dotted lines, the position being such as is taken while the bell is being conveyed into place in the clamp.

Other means for guiding the bell into proper operative position will readily occur to one familiar with the art. While I have shown and described three alternative means of accomplishing this end which I believe to be the most efficacious, I do not limit myself to them, nor to any one of them, but wish to include all means whereby this end may be accomplished.

In my drawings I have in each case shown pipe-tongs as the drawing instrument used with my improved mechanism; but it is obvious that the mechanism may be used in connection with "tags" or with any other form of tool which may be employed in drawing pipe through a bell. I do not therefore limit myself to the use of tongs, but wish to include in my invention its application to any form of tool which may be used for drawing pipe through a bell.

I claim herein as my invention—

1. In a pipe-welding mechanism the combination of a bell and a mandrel or ball, the mandrel or ball being mounted upon the bell in such manner that it will automatically move into operative position within the bell, substantially as described.

2. In a pipe-welding mechanism the combination of a bell and a mandrel or ball; the latter being circular in cross-section and in size approximating the desired inner cross area of the pipe to be welded and being mounted upon the bell itself in such manner as to move automatically into operative position, substantially as described.

3. In a pipe-welding mechanism the combination of a bell and a mandrel or ball, the mandrel or ball being mounted upon the bell in such manner that it may be held from operative position by the tool and may drop into contact with the skelp as the tool is withdrawn from the bell, substantially as described.

4. In a pipe-welding mechanism the combination of a bell, a mandrel or ball mounted upon the bell and together with means whereby the bell with its mandrel or ball may be automatically guided to and held in operative position, substantially as described.

5. In a pipe-welding mechanism the combination of a bell, a mandrel or ball movably mounted upon the bell and capable of being shifted to and from operative position, and a drawing-tool, the mandrel or ball being provided with means engaging the drawing-tool, whereby the mandrel or ball may be guided in its passage along the drawing-tool, substantially as described.

6. In a pipe-welding mechanism the combination of a bell, a mandrel or ball mounted upon the bell and a drawing-tool, the mandrel or ball being provided with a tongue adapted to engage the drawing-tool and guide the bell with the mandrel or ball during its passage along the drawing-tool, substantially as described.

7. In a pipe-welding mechanism the combination of a bell, a mandrel or ball mounted upon the bell, and a drawing-tool; the mandrel or ball being provided with a tongue projecting from its face, and the drawing-tool being provided with a groove adapted to engage the said tongue, whereby the mandrel or ball may be maintained in a fixed lateral position with respect to the drawing-tool, substantially as described.

In testimony whereof I have hereunto set my hand.

GUSTAV F. SIEVERN.

Witnesses:
F. E. GAITHER,
CHAS. F. MILLER.